(12) United States Patent
Lee et al.

(10) Patent No.: US 7,762,389 B2
(45) Date of Patent: Jul. 27, 2010

(54) WORKPIECE CONVEYING MECHANISM AND PRODUCT LINE USING THE SAME

(75) Inventors: Chia-En Lee, Taipei Hsien (TW); Yong Yang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 37 days.

(21) Appl. No.: 12/141,225

(22) Filed: Jun. 18, 2008

(65) Prior Publication Data
US 2009/0188775 A1    Jul. 30, 2009

(30) Foreign Application Priority Data
Jan. 25, 2008    (CN) .................... 2008 1 0300224

(51) Int. Cl.
B65G 23/44    (2006.01)
(52) U.S. Cl. ...................... 198/835; 198/842
(58) Field of Classification Search ................. 198/842, 198/835, 860.2
See application file for complete search history.

(56) References Cited

U.S. PATENT DOCUMENTS

| | | | | |
|---|---|---|---|---|
| 2,179,859 | A * | 11/1939 | Page | 378/57 |
| 3,648,825 | A * | 3/1972 | Burstein | 198/813 |
| 4,142,625 | A * | 3/1979 | Bourgeois | 198/570 |
| 5,044,485 | A * | 9/1991 | Loder | 198/325 |
| 5,967,296 | A * | 10/1999 | Dolan | 198/853 |
| 6,478,161 | B2 * | 11/2002 | Howell | 209/219 |
| 6,675,957 | B2 * | 1/2004 | Greive et al. | 198/835 |
| 6,971,509 | B2 * | 12/2005 | Ertel et al. | 198/813 |
| 7,025,196 | B2 * | 4/2006 | Pfarr et al. | 198/813 |
| 2003/0183493 | A1 * | 10/2003 | Ertel et al. | 198/841 |
| 2005/0085945 | A1 * | 4/2005 | Andoh et al. | 700/230 |
| 2008/0073185 | A1 * | 3/2008 | Brayman et al. | 198/860.2 |

* cited by examiner

*Primary Examiner*—Mark A Deuble
(74) *Attorney, Agent, or Firm*—Steven M. Reiss

(57) ABSTRACT

A conveying mechanism (20) includes a main rotating member (22), a subsidiary rotating member (23) and a transport belt (24). The subsidiary rotating member includes a first driven axle (231) and a second driven axle (232) both driven by the main rotating member, a diameter of the first driven axle is less than that of the second driven axle and the main rotating member. The transport belt is wrapped around the main rotating member and the subsidiary rotating member, and driven to move by the main rotating member.

5 Claims, 6 Drawing Sheets

WORKPIECE CONVEYING MECHANISM AND PRODUCT LINE USING THE SAME

BACKGROUND OF THE INVENTION

1. Field of the Invention

The exemplary invention generally relates to workpiece conveying mechanisms, particularly to a workpiece conveying mechanism that protects workpieces being conveyed and a product line using the same.

2. Description of related art

Conveying mechanisms are widely used in product lines to automatically transport workpieces. Referring to FIG. 5, a typical conveying mechanism 10 includes four supports 11, two rotating members 12 and a transport belt 13. Each rotating member 12 is rotatably mounted on two parallel supports 11 respectively, and the transport belt 13 is tightly wrapped around on the two rotating members 12. The rotating members 12 are configured for driving the transport belt 13. When the rotating members 12 are driven to rotate, the transport belt 13 is driven to move by the rotating members 12 and transport workpieces (not shown) placed thereon.

Also referring to FIG. 6, a typical product line 30 is formed by a plurality of conveying mechanisms 10 assembled together. Each rotating member 12 with a transport belt 13 wrapped thereon is positioned to be adjacent to another rotating member 12 of another conveying mechanism 10. In use, workpieces (not shown) are placed on the transport belts 13. The rotating members 12 are driven to rotate, thus the transport belts 13 is driven to move by the rotating members 12. In this way, the workpieces are transported jointly with the transport belts 13 to be operated. When a workpiece is moved to an end of a conveying mechanism 10, it is transferred to another adjacent conveying mechanism 10 to be continuously moved.

In the typical product lines 30, since the rotating member 12 usually has a large diameter, a gap 14 is likely to be formed between two adjacent conveying mechanisms 10. The workpieces moving on the transport belts 13 may subject to being damaged when traveling through the gaps 14. Additionally, if the diameter of the rotating member 12 is decreased to reduce the gaps 14, a structure of the conveying mechanism 10 may be weakened.

Therefore, a new conveying mechanism and a new product line are desired in order to overcome the above-described shortcomings.

BRIEF DESCRIPTION OF THE DRAWINGS

Many aspects of the conveying mechanism and the product line using the same can be better understood with reference to the following drawings. The components in the drawings are not necessarily drawn to scale, the emphasis instead being placed upon clearly illustrating the principles of the new the conveying mechanism and the product line using the same. Moreover, in the drawings, like reference numerals designate corresponding parts throughout the several views.

DETAILED DESCRIPTION OF THE INVENTION

Figure 1:
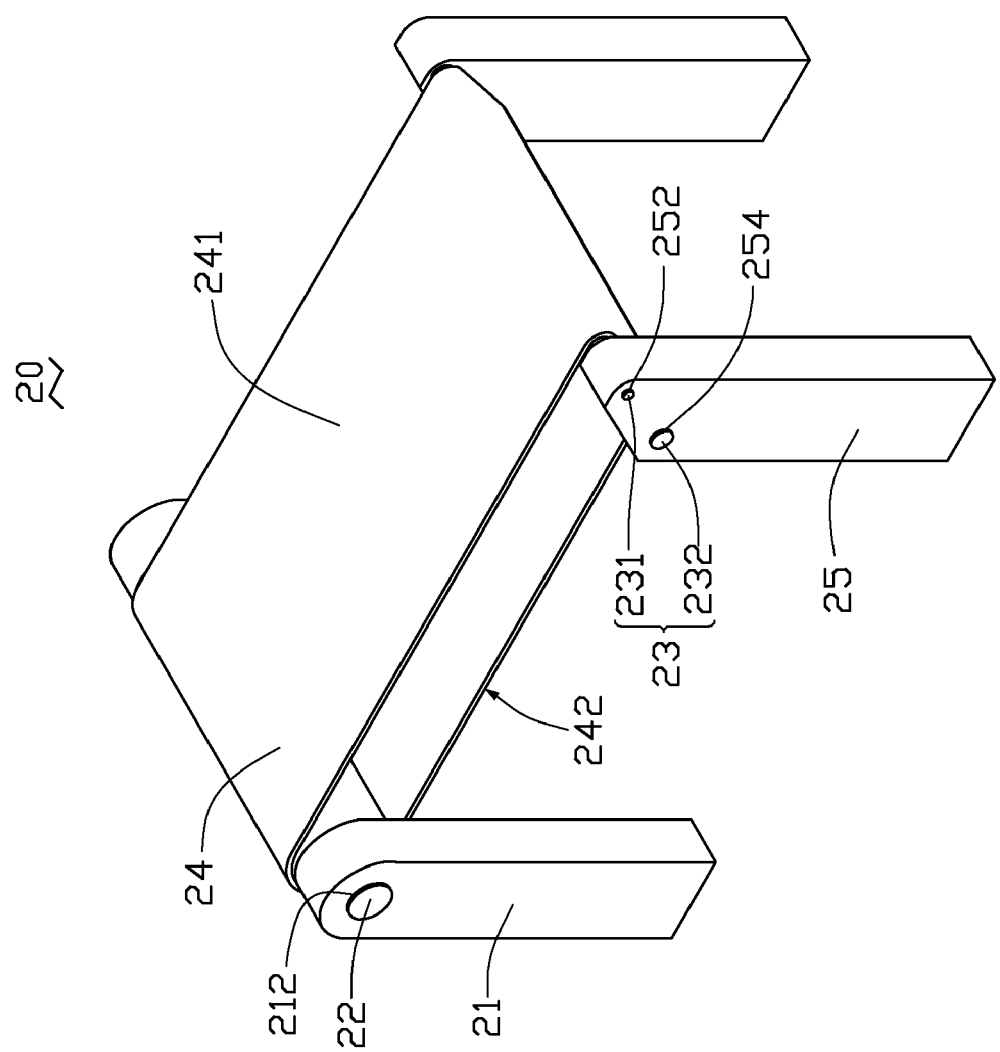
FIG. 1 is a schematic view of a conveying mechanism, according to a first exemplary embodiment.
Figure 2:
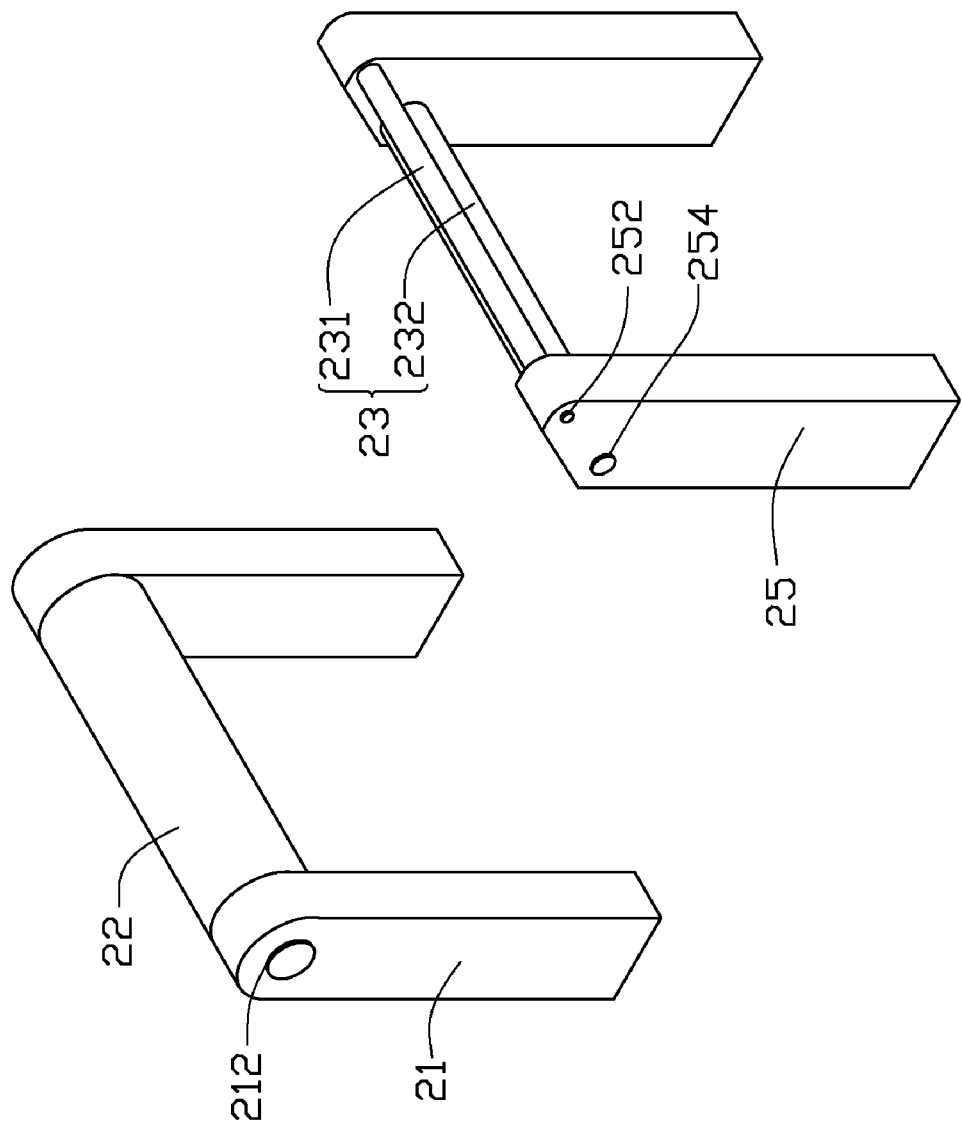
FIG. 2 is a similar to FIG. 1, except omitting a transport belt thereof.

Referring to FIG. 1 and FIG. 2, a conveying mechanism 20 according to an exemplary embodiment is shown. The conveying mechanism 20 includes two first supports 21, a main rotating member 22, a subsidiary rotating member 23, a transport belt 24 and two second supports 25.

The first supports 21 and the second supports 25 are prism-shaped. Each first support 21 defines a first axle hole 212 in one end thereof. One end of each second support 25 defines a second axle hole 252 and a third axle hole 254 adjacent to the second axle hole 252 therein, and the second axle hole 252 is positioned proximate to the end. The second axle hole 252 is configured to have a smaller diameter than that of the third axle hole 254 and the first axle hole 212.

The main rotating member 22 and the subsidiary rotating member 23 drive the transport belt 24. The main rotating member 22 is an axle corresponding to the first axle hole 212. The subsidiary rotating member 23 includes a first driven axle 231 corresponding to the second axle hole 252 and a second driven axle 232 corresponding to the third axle hole 254. The diameter of the first driven axle 231 is smaller than that of the second driven axle 232 and the main rotating member 22. The transport belt 24 is a conventional flexible transport belt.

In assembly, the main rotating member 22 is inserted into the first axle holes 212 of the two first supports 21, and is then rotatably mounted in the two first supports 21. The first driven axle 231 is inserted into the second axle holes 252, and the second driven axle 232 is inserted into the third axle holes 254. Thus, the first driven axle 231 and the second axle hole 232 are both rotatably mounted in the two second supports 25, and the first driven axle 231 is positioned proximate to the end of the second support 25 which defining the second axle hole 252 and the third axle hole 254 therein. Positions of the first supports 21 and the second supports 25 are then adjusted so that the main rotating member 22 are parallel to the first driven axle 231 and the second driven axle 232. The transport belt 24 is wrapped around the main rotating member 22, the first driven axle 231 and the second driven member 232, such that the main rotating member 22, the first driven axle 231 and the second driven member 232 are all surrounded by the transport belt 24 and positioned at an inward side of the transport belt 24. In use, the main rotating member 22 is driven to rotate by a motor (not shown) or other conventional means, and drives the first driven axle 231 and the second driven member 232 to rotate via the transport belt 24. At the same time, the transport belt 24 is also driven to move by the main rotating member 22 to transport workpieces (not shown) placed thereon.

Figure 3:
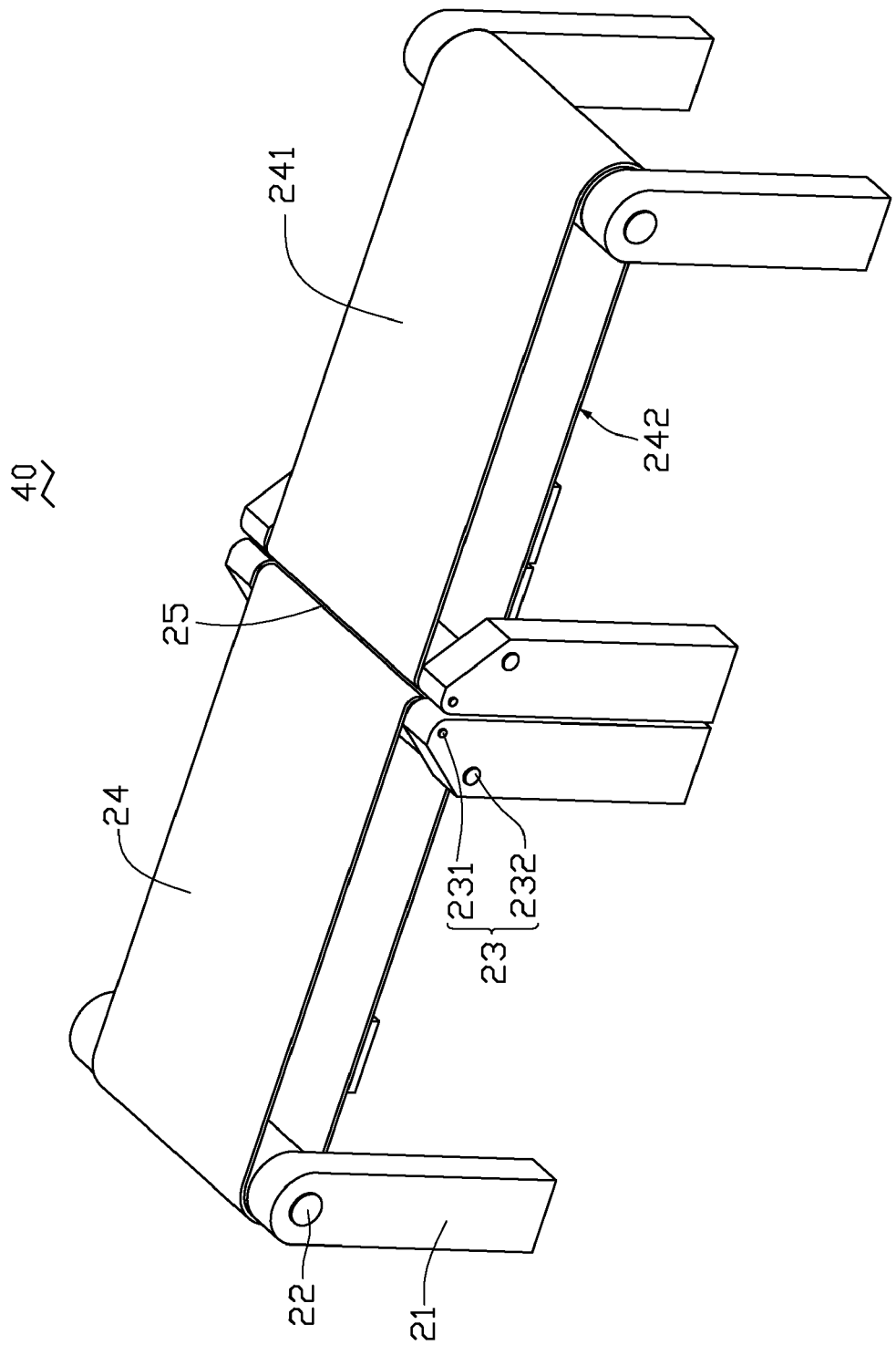
FIG. 3 is a schematic view of a product line, according to a exemplary embodiment.

Also referring to FIG. 3, a product line 40 according to an exemplary embodiment is shown. The product line 40 is made of two aforementioned conveying mechanisms 20. The two conveying mechanisms 20 are assembled together and positioned end to end, wherein the main rotating members 22, the first driven axles 231 and the second driven axles 232 of the two conveying mechanisms 20 are positioned to be parallel to each other. The portion of each transport belt 24 wrapped on the first driven axle 231 defines an arc-shaped abutting surface. The arc-shaped abutting surfaces of the two transport belts 24 of the two conveying mechanisms 20 are positioned to be tangent to each other, thus the product line 40 is assembled. In use, the main rotating members 22 are rotated, and workpieces placed on one transport belt 24 can be transported to another transport belt 24.

In use of the product line 40, when a workpiece is transported from one of the two conveying mechanisms 20 to another, it is supported on the two tangent abutting surfaces of the two transport belts 24. Since the first driven axle 231 has a less diameter than that of the main rotating member 21 and the second driven axle 232, the gap (not labeled) formed above the tangent portions of the abutting surfaces of the transport belts 24 of the two conveying mechanisms 20 is lessened, thus the workpiece is protected from being damaged when traveling through the gap. Furthermore, the second driven axle 232 having a larger diameter enhances substance of the conveying mechanisms 20, thus the structure of the conveying mechanisms 20 is prevented from being weakened by the small diameter of the first driven axle 231.

Figure 4:
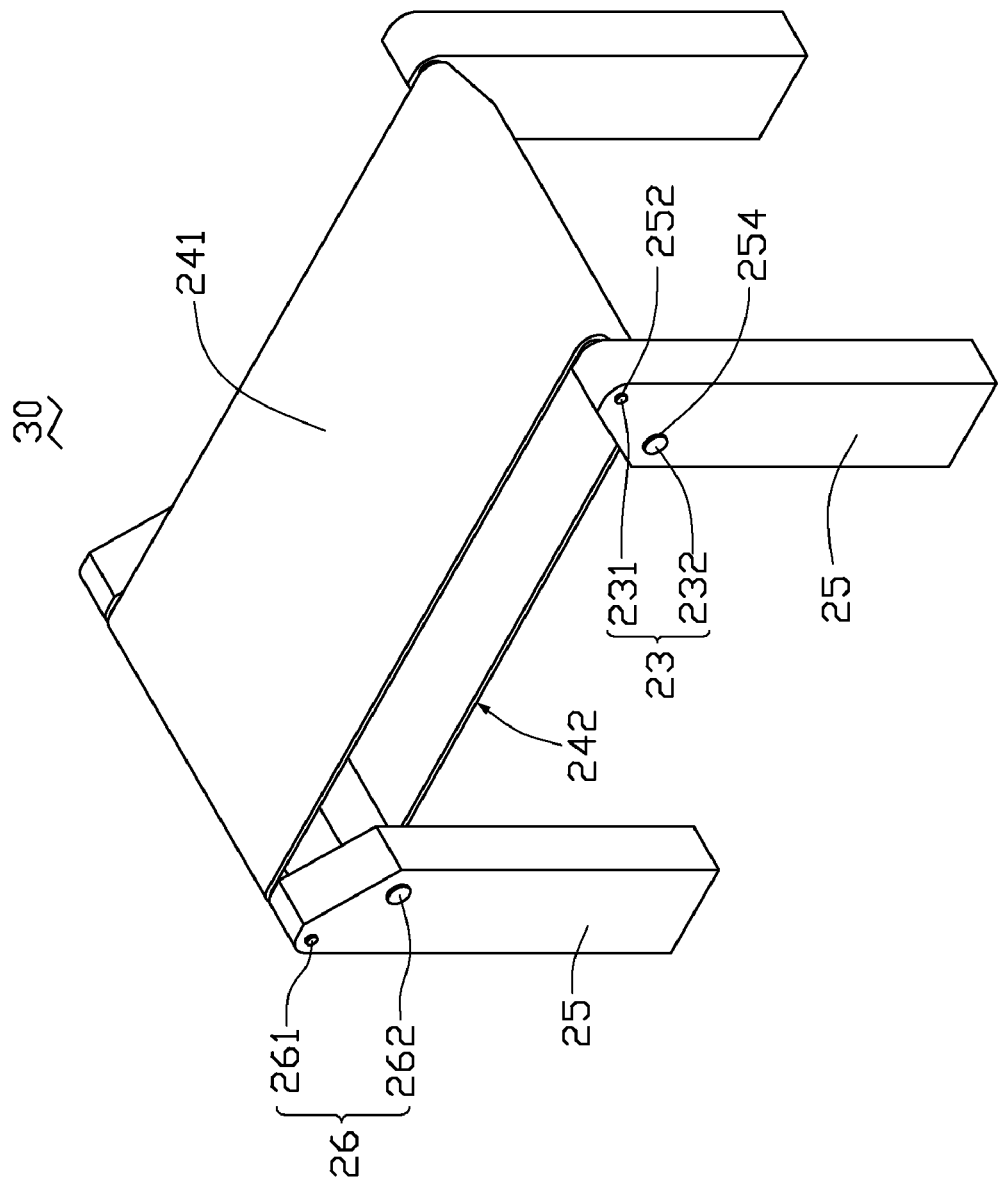
FIG. 4 is a schematic view of a conveying mechanism, according to a second exemplary embodiment.
Figure 5:
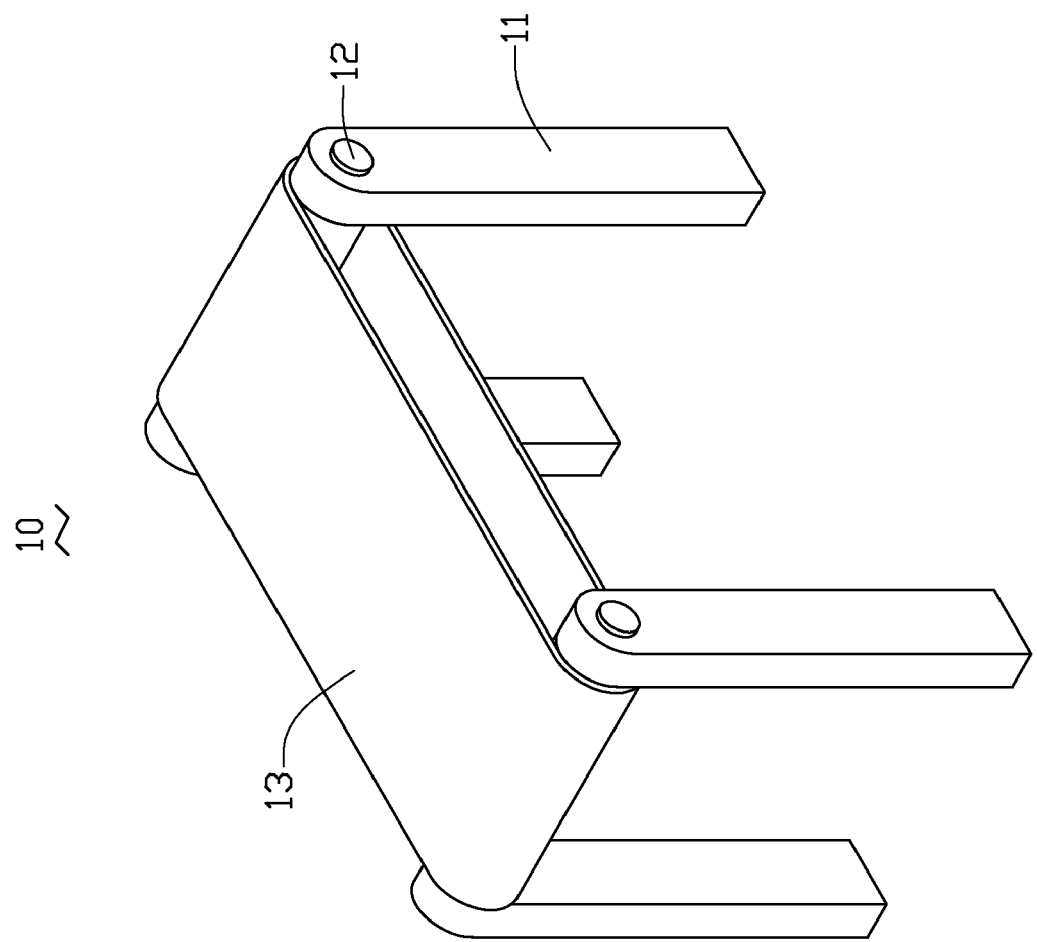
FIG. 5 is a schematic view of a typical conveying mechanism.
Figure 6:
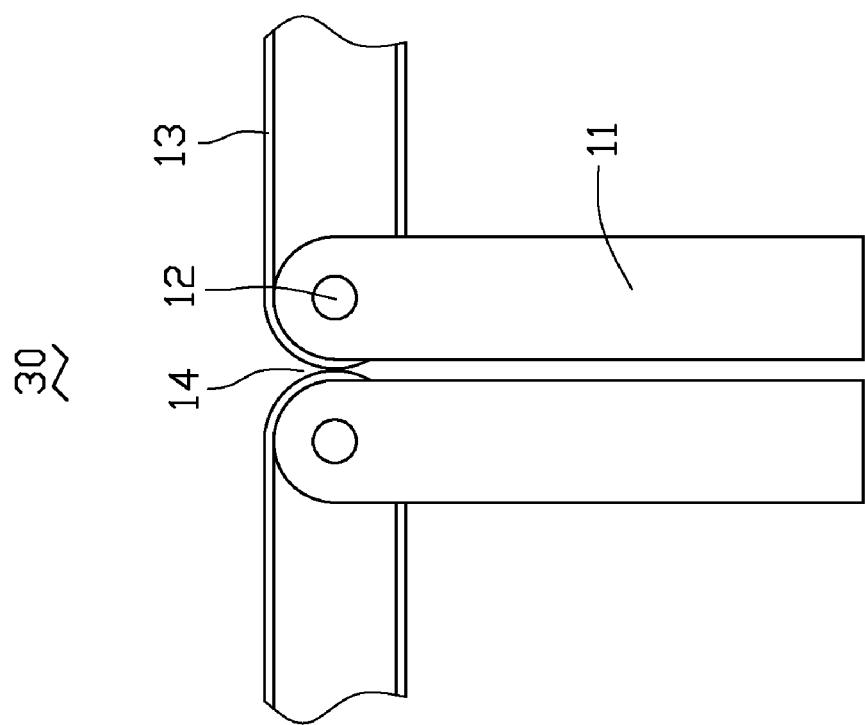
FIG. 6 is a schematic view of a typical product line.

Also referring to FIG. 4, a conveying mechanism 30 according to a second embodiment is shown. The conveying mechanism 30 is similar to the conveying mechanism 20, except that the first supports 21 are replaced by the second supports 25. Correspondingly, in the conveying mechanism 30, the main rotating member 22 is replaced by another main rotating member 26 includes a first driver axle 261 and a second driver axle 262, which are respectively configured and assembled similar to that of the first driven axle 231 and a second driven axle 232. The portion of each transport belt 24 wrapped on the first driver axle 261 also defines an arc-shaped abutting surface. Thus, the abutting surfaces of the transport belts 24 wrapped on the first driver axle 261 and the first driven axle 231 respectively mounted on two ends of a conveying mechanism 30 can be positioned to be tangent to the abutting surface of the transport belt 24 wrapped on the first driven axle 231 of an adjacent conveying mechanism 20, or the first driver axle 261 or the first driven axle 231 of another conveying mechanism 30. In this way, one or more the conveying mechanism 30 can be assembled between two conveying mechanisms 20 to form an extended product line 40, wherein the abutting surface of the transport belt 24 wrapped on at least one axle (i.e., the first driven axle 231 and/or the first driver axle 261) of each conveying mechanism 20/30 is positioned to be tangent with the abutting surface of the transport belt 24 wrapped on the axle(s) of one or two adjacent conveying mechanism(s) 20/30.

After the conveying mechanism 10 is assembled, any one of the two first supports 21 and/or any one of the two the second supports 25 can be omitted and the subsidiary rotating member 23 can be directly driven by motors.

It is believed that the exemplary embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A product line, comprising:
a plurality of conveying mechanisms assembled together, each conveying mechanism including a main rotating member, a subsidiary rotating member and a transport belt wrapped around the main rotating member and the subsidiary rotating member; the main rotating member and the subsidiary rotating member both surrounded by the transport belt and positioned at an inward side of the transport belt; the main rotating member including a first driver axle and a second driver axle, a diameter of the first driver axle being less than that of the second driver axle; the subsidiary rotating member including a first driven axle and a second driven axle, a diameter of the first driven axle being less than that of the second driven axle; wherein
the surfaces of the transport belts respectively wrapped on two first driven axles of any two adjacent conveying mechanisms abut each other and are positioned to be tangent to each other.

2. The product line as claimed in claim 1, wherein each conveying mechanism includes at least one first support configured for rotatably mounting the main rotating member thereon.

3. The product line as claimed in claim 2, wherein the first driver axle and the second driver axle are rotatably mounted on the first support, and the first driver axle is positioned proximate to an end of the first support.

4. The product line as claimed in claim 1, wherein each conveying mechanism includes at least one second support configured for rotatably mounting the subsidiary rotating member thereon.

5. The product line as claimed in claim 4, wherein the first driven axle and the second driven axle are rotatably mounted on the second support, and the first driven axle is positioned proximate to an end of the second support.

* * * * *